United States Patent [19]

Harding et al.

[11] Patent Number: 5,003,292

[45] Date of Patent: Mar. 26, 1991

[54] FIBER OPTIC SECURITY SYSTEM FOR PROTECTING EQUIPMENT FROM TAMPERING

[75] Inventors: Matthew W. Harding, Hesperia; Erick C. Christoferson, Placentia; Edward Robak, Orange, all of Calif.

[73] Assignee: James E. Grimes Co., Inc., Brea, Calif.

[21] Appl. No.: 530,265

[22] Filed: May 30, 1990

[51] Int. Cl.[5] .......................... G08B 13/14; G02B 6/38

[52] U.S. Cl. ............................... 340/568; 250/227.14; 350/96.21

[58] Field of Search ............... 340/556, 555, 568, 687; 250/227.14–227.15; 350/96.2–96.21; 356/73.1; 455/612

[56] References Cited

U.S. PATENT DOCUMENTS

| | | | |
|---|---|---|---|
| 4,229,068 | 10/1980 | Hodge et al. | 350/96.2 |
| 4,379,289 | 4/1983 | Peek | 340/555 |
| 4,654,640 | 3/1987 | Carll et al. | 340/568 |
| 4,735,212 | 4/1988 | Cohen | 250/227.14 X |
| 4,749,246 | 6/1988 | Epworth et al. | 250/227.14 X |
| 4,760,382 | 7/1988 | Faulkner | 340/568 X |
| 4,784,454 | 11/1988 | Dyott | 350/96.2 |
| 4,865,412 | 9/1989 | Patterson | 350/96.21 |
| 4,889,405 | 12/1989 | Walker et al. | 350/96.21 |
| 4,920,334 | 4/1990 | DeVolpi | 340/568 |
| 4,928,004 | 5/1990 | Zimmermann et al. | 250/227.14 |

*Primary Examiner*—Glen R. Swann, III
*Assistant Examiner*—Thomas J. Mullen, Jr.
*Attorney, Agent, or Firm*—Knobbe, Martens, Olson & Bear

[57] ABSTRACT

The present invention is a fiber optic security system for protecting expensive equipment from tampering or theft. The fiber optic security system comprises an emitter for generating signals, a detector connected to an alarm for monitoring the signals and a sensing coupler or photon switch of novel design which is easily mounted to each piece of equipment that requires protection without defacing the equipment. The sensing coupler mounts the tips of optical fiber ends in a position aligned along a single axis to allow light generated by the emitter to pass through. Any attempt to remove the sensing coupler causes the tips to be misaligned and the light to be deflected. This causes an optic path interrupt and causes the detector to trigger an alarm.

16 Claims, 5 Drawing Sheets

Fig. 5
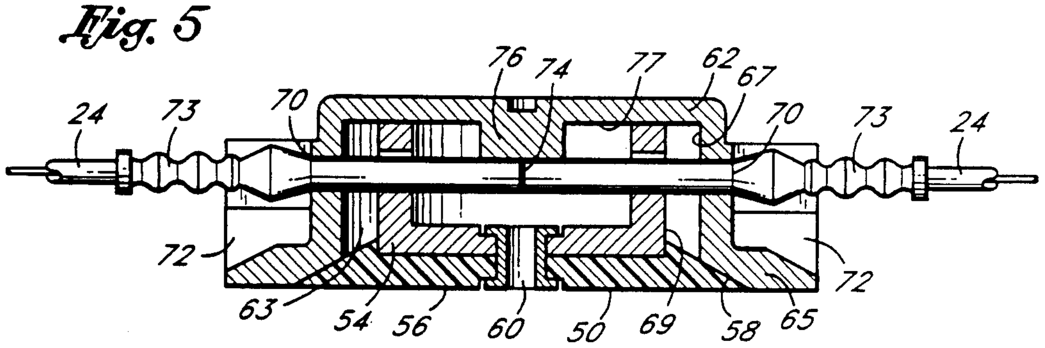
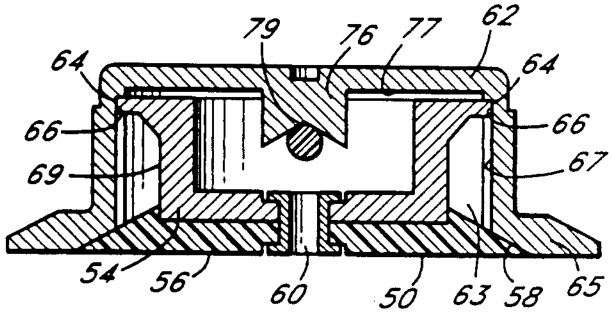
Fig. 6
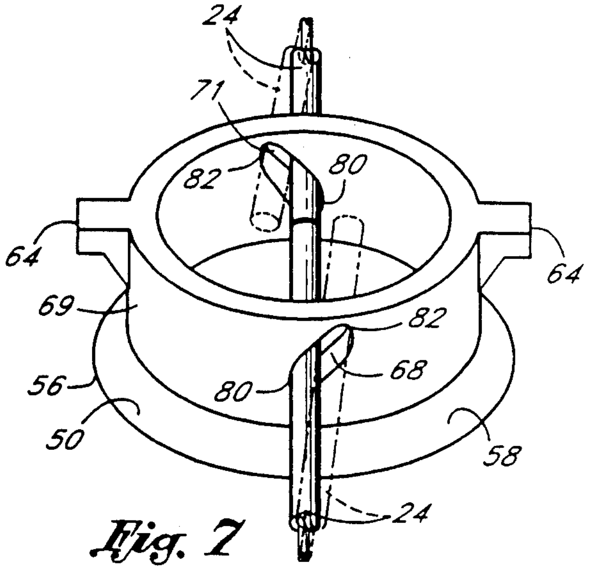
Fig. 7

FIBER OPTIC SECURITY SYSTEM FOR PROTECTING EQUIPMENT FROM TAMPERING

FIELD OF THE INVENTION

This invention relates generally to optical security systems for protecting expensive equipment such as computer systems, or the like, from tampering or theft. More particularly, the present invention relates to an optical security system incorporating a sensing coupler or photon switch of novel design.

BACKGROUND OF THE INVENTION

Theft and tampering of objects of value, in particular expensive equipment such as computer systems, or the like, presents an ongoing problem. Reliable protection for computers is especially critical since the importance of stored data may outweigh the value of the equipment. Security systems range from traditional methods of security, such as physically securing the equipment, to more advanced electrical and fiber optical systems. Measures for physically securing the equipment typically employ high strength cables such as conventional bicycle flex-cables with a conventional lock, which often result in damage to the item. Patrols by security guards or surveillance with cameras, although effective, greatly increase the cost of securing the equipment.

Electrical security devices for securing facilities or equipment, in accordance with one prior art approach, have wires looped around the facility or equipment that requires protection. Typically, such wires run from a power or signal source through some kind of intrusion sensing device to a control unit that monitors the status of the intrusion sensing device In the simplest form, such an intrusion sensing device comprises a switch which, depending on whether it is open or closed, indicates an alarm or secure state. However, such electrical security systems have a number of drawbacks. Thieves can easily tamper with and deceive such systems, as by shorting the wires, or by determining and injecting via a simple electrical splice whatever signal is required to indicate the secure state. Thus, a secured facility can be entered or equipment stolen without generating an alarm, even though the intrusion sensing device is in the alarm state. Moreover, electrical security systems are prone to operating difficulties when located near high voltage lines or other interference sources or radio generators. The electrical security devices, themselves, also can interfere with other electrical devices present in the vicinity.

More advanced security systems employ optical signals carried on optic fibers Such systems cannot be circumvented by shorting or injecting a signal, since the fiber must be cut to introduce a short or tap. Typically, optical security systems include an emitter on one end of a fiber optic cable and a receiver at the other end. Generally, such a system relies on the detection of an interruption or alteration of an otherwise constant pattern of energy flow which may be light or other such energy. One such optical device currently available has optical fibers linked to and around objects of value which may be easily removed or tampered with by vandals without sounding an alarm.

Some of the available protective alarm systems of the type discussed above serve to protect equipment by physically connecting a security device to the equipment. In general, with such existing systems it is necessary that the equipment requiring protection have natural apertures, openings, or holes so that the security device may be suitably attached thereto. If not, the equipment is normally modified by drilling holes or adding appendages in order to interconnect the equipment to be secured with the security device. Frequently this is objectionable and destructive to the equipment, especially in cases where the equipment presents a substantial investment. Moreover, in such cases, the security devices are subject to tampering in one way or another and therefore do not reliably protect the equipment.

There exists a need for better security systems that are convenient and inexpensive, yet foolproof. A portable, reliable optical security system which can secure expensive equipment would satisfy a long-felt need in the industry.

SUMMARY OF THE INVENTION

The present invention provides an optical security system comprising an emitter for generating signals and transmitting them via fiber optic cables, a detector connected to an alarm for monitoring the signals and a sensing coupler or photon switch of novel design for sensing an alteration in the signal. The optical security system is beneficial for protecting expensive equipment, such as computers, copiers, or the like, from tampering or theft.

In accordance with a preferred aspect of the invention, the sensing coupler is an independent component which is easily mounted to each piece of equipment that needs to be secured. The sensing coupler may be mounted to any surface of the equipment without defacing the equipment or detracting from it's aesthetic appearance. Once mounted and activated, any attempt to pry the sensing coupler loose, automatically triggers an alarm.

In accordance with another preferred aspect of the invention, the sensing coupler or photon switch couples the ends of optic fibers aligned along a single axis. Any attempt to remove the sensing coupler causes the optic fibers to be misaligned and the signal to be deflected which triggers the alarm.

These, as well as other features of the invention will become apparent from the detailed description of the preferred embodiment which follows, considered together with the appended drawings.

BRIEF DESCRIPTION OF THE DRAWING

A preferred embodiment of the present invention, as well as an alternate embodiment, are illustrated in and by the following drawings in which like reference numerals indicate like parts and in which:

FIG. 5 is a cross sectional view taken along line 5—5 of FIG. 3.

FIG. 6 is a cross sectional view taken along line 6—6 of FIG. 3.

FIG. 7 is a perspective view of the base portion of the sensing coupler of the present invention illustrating ends of the optic fibers in an aligned position along a single axis, in solid lines, and in a misaligned position, in phantom lines.

DETAILED DESCRIPTION OF THE PREFERRED EMBODIMENT

Figure 1:
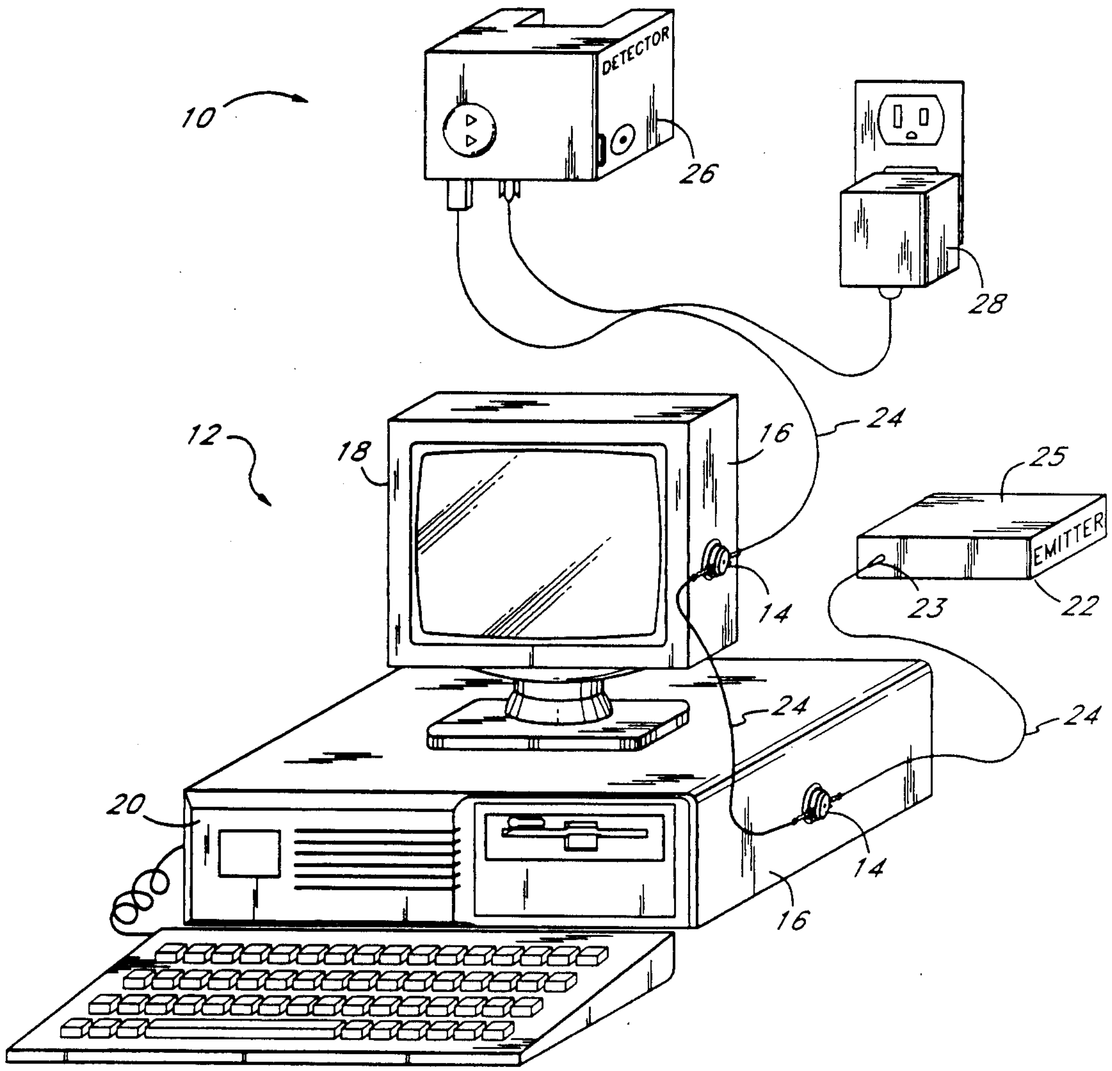
FIG. 1 is a perspective view illustrating the optical security system of the present invention, incorporating a plurality of sensing couplers or photon switches, in a preferred form, mounted to the components of a computer system.

FIG. 1 illustrates generally an optical security system 10 in accordance with the present system. The security system 10 is beneficial for protecting all kinds of expensive equipment, such as computer equipment, or the like, from possible tampering or theft. In an exemplary illustration, the optical security system 10 is installed to protect a computer system 12. The optical security system 10 comprises a sensing coupler or photon switch 14 which is preferably mounted directly to a desired surface 16 of each important component of the computer system 12. In the preferred embodiment, each sensing coupler 14 is individually mounted to each separate unit. For example, as shown in FIG. 1, sensing couplers 14 are mounted separately on a monitor 18 and on a computer chassis 20. A significant advantage of the sensing coupler 14 is that it is conveniently installed without defacing the equipment or destroying it's aesthetic appearance.

The sensing coupler 14 is connected to an emitter 22 which generates a signal, such as red or infrared light. The emitter 22 is of conventional design known to one skilled in the art. In an exemplary embodiment, the emitter 22 preferably includes four alkaline long-life batteries housed within a battery holder. With these batteries, the emitter 22, typically a light emitting diode, is able to operate for approximately one year before requiring new batteries. The signal is generated by conventional electronics and is preferably a pulsed light signal, with a pulse of light lasting 1/66,000 of a second. Preferably, there are approximately 3 cycles per second, which advantageously provides suitable intensity with a very low duty cycle (1/22,000) to avoid unnecessarily reducing battery life. The signal exits through an emitter output 23.

The signal is transmitted through thin, flexible optic fibers 24 (which are commercially available), and through sensing couplers 14 attached to each important piece of equipment, to a detector 26. The detector 26, monitors the signal for any disruption of the signal received. If any disruption is detected, the detector 26 triggers an audible alarm (not shown) preferably included within the detector 26. The detector 26 may also be connected to an external alarm 34 (shown in FIG. 2) which is optional. The detector 26 is connected to the alarm 34 via a relay interface 36 (shown in FIG. 2). Any attempt to remove the sensing coupler 14 by prying it loose immediately triggers the alarm. Likewise, cutting the optic fibers 24 or attempting to disconnect the detector 26 is equally futile and activates the alarm. The detector 26 may be of any conventional type known to those skilled in the art. Typically, such detectors 26 comprise a clock which generates a clock pulse for a given time interval and a counter for counting the number of pulses received from the clock between each light pulse. If the number of pulses received in a given time interval are greater than expected then an alarm is sounded indicating an interruption in the light signal.

In an exemplary embodiment, back up power to the detector 26 is preferably provided by two 9 volt Ni-Cad rechargeable batteries which are kept charged while power is supplied from a standard wall transformer 28. The batteries provide the detector 26 with more than twelve hours of additional operating time. In the event of a power failure in the building, continuous power to the security system 10 is thus provided A chirping sound or other indication is emitted approximately every one hundred and twenty seconds if the main power is lost. If battery power has been exhausted, the alarm is automatically activated for up to a period. of twenty minutes. The detector 26 has a red and green LED (Light emitting Diode) display (not shown). If the signal is received without disruption (i.e., everything is operating normally), the green LED is continuously ignited, and the red LED remains off. If the signal is disrupted momentarily or is missing, the red LED ignites and an output from the detector 26 initiates the alarm interface 36.

The detector 26 preferably has a keyswitch (not shown) which has two positions, "armed" and "reset." When the key is turned to the "reset" position, the detector 26 may be deactivated during normal work hours Both LED's remain off. To activate the detector 26 and operate the security system 10, the key is merely turned to the "armed" position and then removed. At this point, the green LED lights up if the primary input power is present.

In an exemplary embodiment, the detector 26 is advantageously provided with a motion detection feature to prevent an attempt to deactivate the security system 10 by removing the detector 26. Turning on the detector 26 automatically activates this feature and even the slightest movement of the detector 26 from an originally installed position is sensed causing the alarm to sound.

Figure 2:
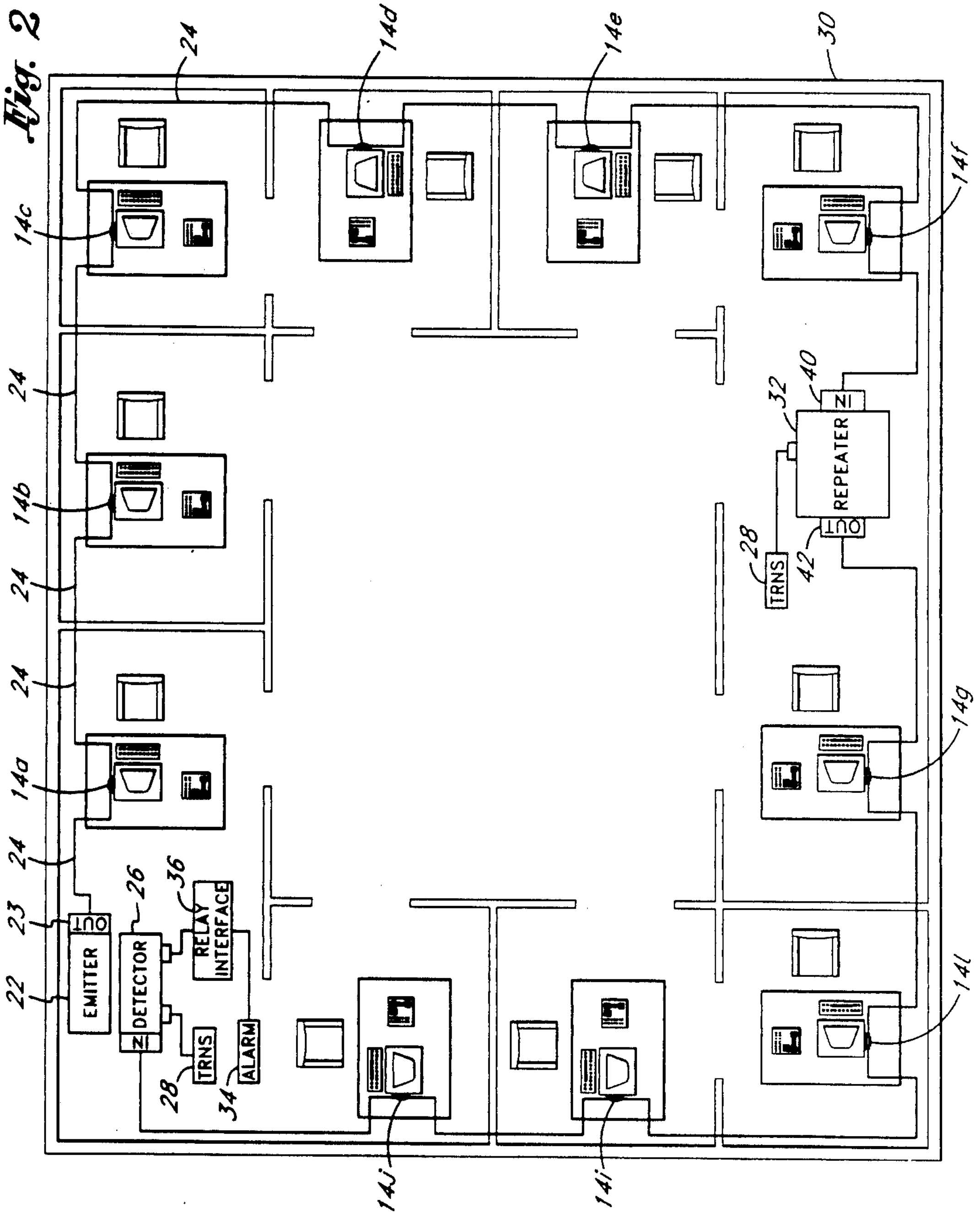
FIG. 2 is a plan view illustrating the optical security system of the present invention installed within an exemplary office area. A series of sensing couplers are individually mounted to each piece of equipment in the office.
Figure 3:
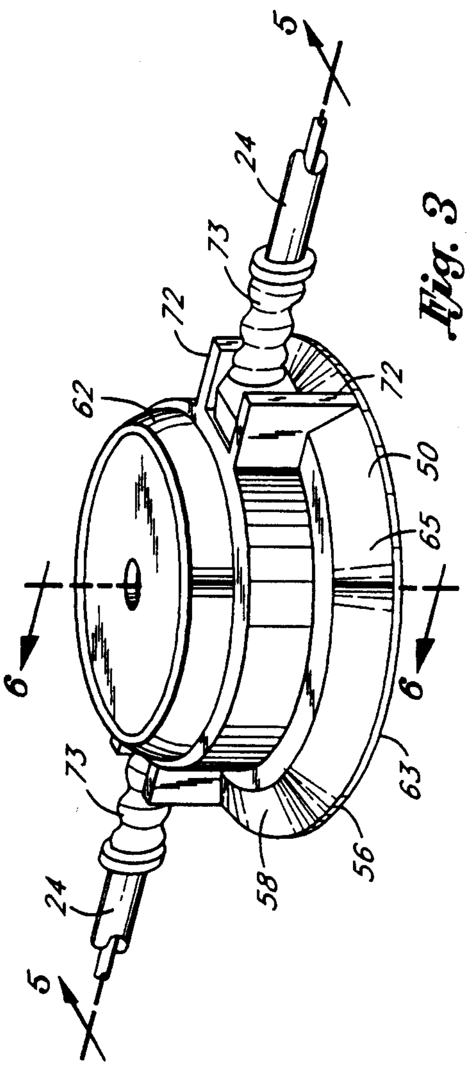
FIG. 3 is a perspective view illustrating the sensing coupler or photon switch of the present invention.

As shown in FIG. 2, each sensing coupler 14 is preferably mounted to each piece of equipment and all the sensing couplers 14 are connected in series. By way of example, FIG. 2 illustrates a floor plan of an office area 30 having a plurality of computer systems 12 placed at distinct locations. Each computer system 12 has a sensing coupler 14 mounted thereto, and each of the sensing couplers 14*a–f* are linked together in series. In this example, the monitors are not shown as protected, as in FIG. 1, but they may be if desired. The signal generated by the emitter 22 is transmitted via the optic fibers 24 and each of the sensing couplers 14*a–f* in the series, in succession.

In the preferred embodiment, as many as eight sensing couplers 14 may be so connected, however the illustrated embodiment shows only six sensing couplers 14*a–f*. A repeater or power booster 32, of conventional design, is preferably used to facilitate connecting additional sensing couplers 14*g–f* beyond eight. In the preferred embodiment, the repeater 32 can accommodate eight additional sensing couplers. Thus, a repeater 32 is added before every additional eight sensing couplers 14.

Also, if the available optic fibers 24 are of insufficient length, the repeaters 32 can be used to advantageously link two or more optic fibers 24. Thus, by using the repeaters 32, the security system 10 can be installed throughout an entire office, place of business, school, or home.

In an exemplary embodiment, each repeater 32 includes Ni-Cad rechargeable batteries which provide continuous power and act as a power back-up in the event of a power failure in the main facility. Accordingly, uninterrupted surveillance at all times is ensured. The repeater 32 is supplied with external power by a standard wall transformer 28. The emitter output 23 or the optic fiber 24 from the last sensing coupler 14*f* feeds into the repeater 32 via an input connector 40 and to a light signal detector located within the repeater 32. The signal is then amplified and passed through an emitter located adjacent the output 42. The signal then passes through the output 42 to additional sensing couplers 14*g*–*j* or to another repeater 32.

In an exemplary embodiment, the repeater 32 has a green LED which indicates the presence of a signal and normal operation of the system. In addition, the LED also provides an indication in the event of a primary power loss so that security is alerted. The LED also indicates if any of the optic fibers 24 have been inadvertently disconnected during the normal working day.

Figure 4:
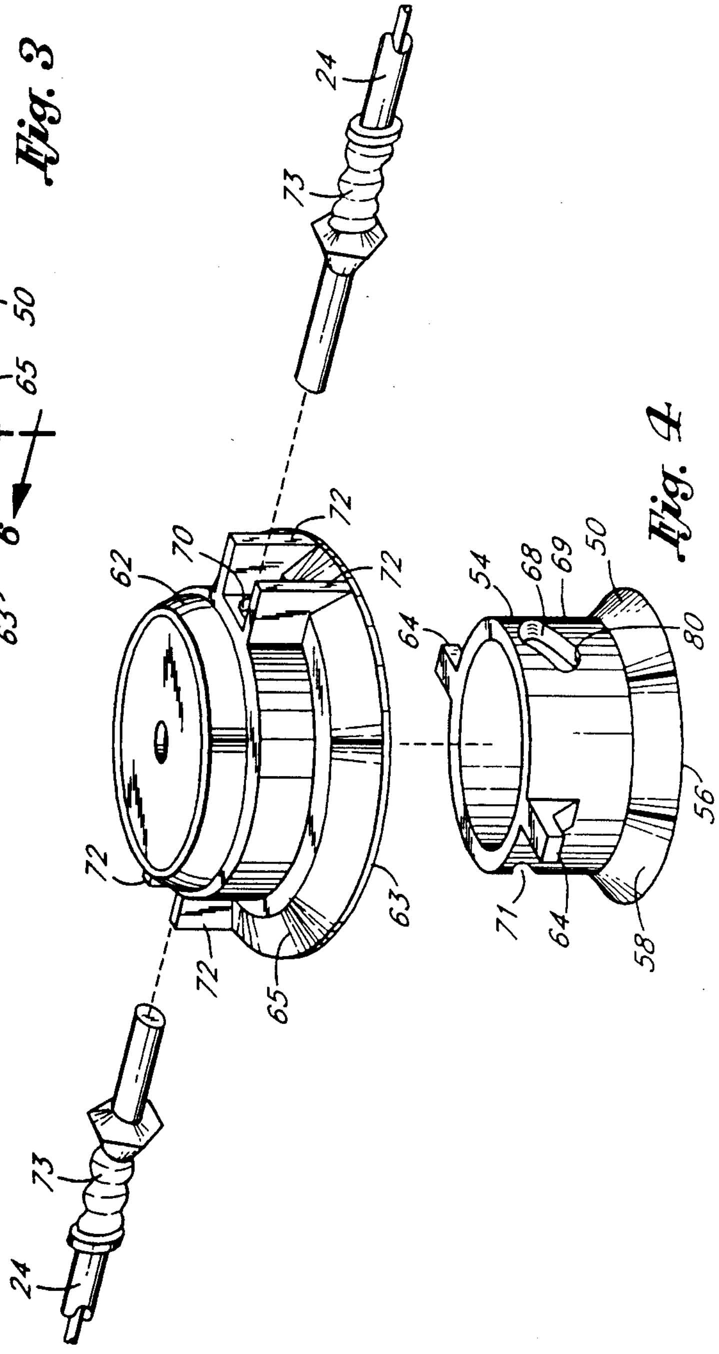
FIG. 4 is an exploded view illustrating the components of the sensing coupler of the present invention.

Referring now to FIGS. 3, 4, 5 and 6, the sensing coupler 14 in a preferred form, comprises a base portion 50 and a hub 54 rotatably attached thereto. The sensing coupler 14 is preferably constructed from plastic or any such suitable material. As shown in FIG. 4, the base member 50 has a substantially circular bottom surface 56 which gradually tapers inward at 58. As best shown in FIGS. 5 and 6, the hub 54 is mounted to the base portion 50 by a hollow eyelet fastener 60, or any other suitable means. This connection allows the hub 54 to freely rotate about the base portion 50. The hub 54 is substantially cylindrical in shape and extends in a direction vertically upward from the base portion 50.

In accordance with a significant feature of the present invention, the sensing coupler 14 is easily mounted to any desired surface of the equipment by coating the lower base surface 56 with adhesive and adhering it to the equipment surface, without damaging the equipment or detracting from its aesthetic appearance. Thus, it is not necessary to use a glue which is strong enough to hold the surface 56 and the equipment together such that attempts to pry the sensing cover 14 loose, exert forces which could damage the equipment. Such adhesives mar the surface of equipment. The sensing coupler 14 further comprises a protective cover 62 configured somewhat like a bottle cap which is installed over the base 50 and hub 54. The protective cover 62 has a generally cylindrical configuration with a hollow interior 63 and a peripheral rim 65 which is gently flared toward it's outer edge. The protective cover 62 completely encompasses the base portion 50 and hub 54, such that the inner wall surface 67 of the protective cover surrounds the outer wall 69 of the hub 54 and the peripheral rim 65 assumes intimate contact with the equipment surface surrounding the base portion 50.

Advantageously, the protective cover 62 completely covers the base portion 50 and hub 54 such that, in order to remove the sensing coupler 14, a thief would have to forcefully pry the protective cover 62 off, prior to gaining access to the base portion 50. Thus, the protective cover 62 isolates the base portion 50 from thieves or vandals and consequently discourages tampering. Because the cover 62 is flush with the equipment surface, it is impossible to get a prying tool under the base portion 50 without first lifting an edge of the cover 62. In addition, the protective cover 62 is designed to freely rotate about the hub 54, to render any attempt to twist off the protective cover 62 and gain access to the base 50 futile.

To guide the protective cover 62 into position, two alignment tabs 64 are disposed on opposing ends of the hub 54. As best shown in FIG. 6, the alignment tabs 64 project radially outward from the hub 54 and engage two corresponding alignment grooves 66 formed within the inner wall surface 67 of the protective cover 62. When the protective cover 62 is installed over the base 50 and hub 54, the alignment tabs 64 occupy the alignment grooves 66.

As shown clearly in FIG. 4, two generally angulated constant width slots 68, 71, oriented at a 45° angle from the vertical axis, are disposed on opposing sides of the hub 54 midway between the alignment tabs 64. As shown in FIG. 7, the slots 68, 71 are oriented at opposite 45° angles from each other, with the lower extremity 80 of the slots 68, 71 being diametrically opposed to one another.

Returning to FIGS. 3, 4 and 5, after the base 50 is attached to the protected equipment, and after the cover 62 is placed on the base 50, the optic fibers 24 with their surrounding fittings 73 are inserted through openings 70 provided in the protective cover 62. The openings 70 are guarded on either side by a pair of protective walls 72 designed to hold the optic fibers 24 therebetween. The optic fibers 24 pass through the lower extremities of the slots 68, 71 and are aligned along a single axis with their tips 74 placed against each other in intimate contact, as shown clearly in FIG. 5. It is important for the ends to be aligned such that the tips 74 butt against each other in order to prevent any loss in intensity of the signal. As best shown in FIGS. 5 and 6, the tips 74 are urged into alignment by a wedge-like protrusion 76 extending inward from the top inner surface 77 of the cover 62 and located towards the middle thereof. The wedge-like protrusion 76 terminates in an inverted V-shape 79 which cradles the optic fibers 24. Thus, the tips 74 are urged toward alignment by the wedge-like protrusion 76, and by the diametrically opposed alignment of the bottom of the slots 68, 71. The protective cover 62 is held in place on the hub 54 by the optic fibers 24. Once the protective cover 62 is installed, the optic fibers 24 are aligned within the lower ends 80 of the slots 68, 71. When in this position, the signal may be transmitted through the optic fibers 24 uninterrupted.

Referring now to FIG. 7, since the optic fibers 24 pass through the protective cover 62 as well as the hub 54, lifting the protective cover 62 forces the optic fibers 24 in an upward direction. The tips 74 thus slide up the angled slots 68, 71 to an upper end 82, away from one another, causing the tips to be misaligned and resulting in deflection of the signal. The inherent resiliency of the plastic fiber optic tips enhances their sensitivity to any disruption. Also, attempting to extract the optic fibers 24 out from the openings 70, would cause a sufficient drop in light intensity which would also activate the alarm. Because the fibers 24 hold the cover 62 in place, any force tending to lift the cover 62 will urge the fibers 24 along the slots 68, 71, to cause an optical disruption.

Figure 8:
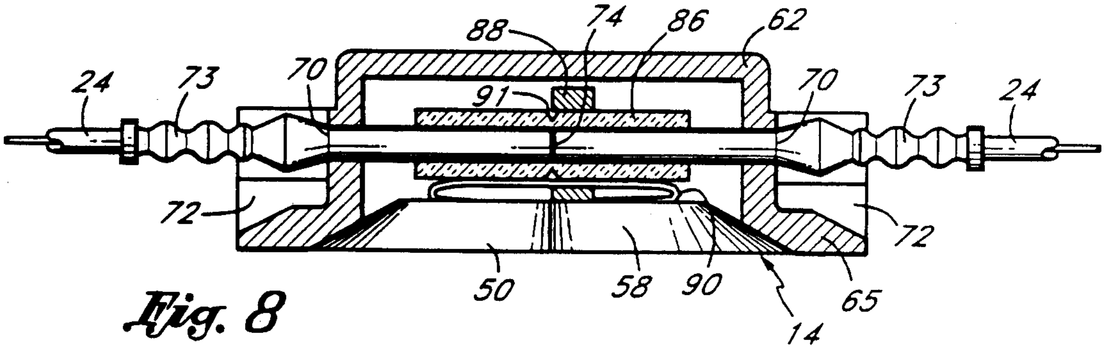
FIG. 8 is a cross sectional view illustrating an alternative embodiment of the sensing coupler of the present invention.
Figure 9:
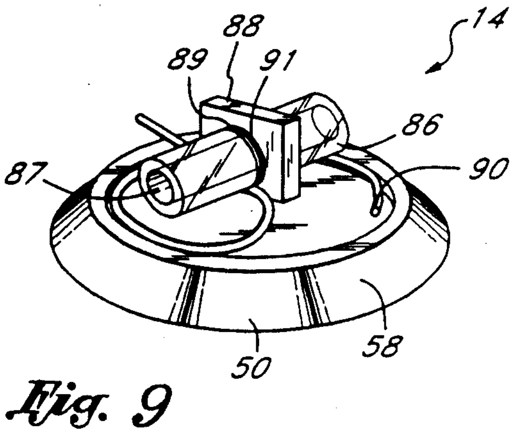
FIG. 9 is a perspective view of the base portion of the coupler of FIG. 8 illustrating the manner in which the base supports a glass tube and toroidal spring.

Referring now to FIGS. 8 and 9, in accordance with an alternative embodiment, the photon switch 14 comprises a short glass tube 86 having notch 91 and defining a central passage 87 therethrough, supported by a glass holding rib 88 extending vertically upward from the base portion 50. The rib 88 is offset from the center so as to be positioned adjacent to the notch 91 in the glass tube 86. The notched glass tube 86 passes through a hole 89 in the glass holding rib 88. Disposed directly below the glass tube 86 is a compressed torsional loop spring 90. Once the notched glass tube 86 is inserted in place, the protective cover 62 is installed in a substantially similar fashion as the preferred embodiment. The optic fibers 24 with their fittings 73 are inserted through the openings 70. The optic fibers 24 are advanced through the central passage 87 of the notched glass tube 86 until the tips 74 butt against each other at the center. Thus, the junction or the point at which the tips 74 butt against each other is centered and aligned with the notch 91 located beyond the rib 88. The inner periphery of the glass tube 86 intimately surrounds the external periphery of the optic fibers 24. Any attempt to pry the protective cover 62 loose or twist it off applies pressure on the glass tube 86 at the notch 91, causing it to break in a controlled mode at the junction of the tips 74. Once the glass tube 86 has broken the compressive force of the spring 90 causes one of the tips 74 to be instantly deflected sideways relative to the other tip 74, causing an interruption in light transmission. Advantageously, since the rib 88 is offset from the center and the junction of the tips 74 is in the center, the rib 88 does not hinder the tip 74 from being displaced, as breakage occurs along the plane of notch 91.

It will be appreciated that certain structural variations may suggest themselves to those skilled in the art. The foregoing detailed description is to be clearly understood as given by way of illustration, the spirit and scope of the invention being defined solely by the appended claims.

What is claimed is:

1. An optical security system for protecting equipment from tampering or theft, comprising:

a plurality of optic fibers;

a plurality of sensors, said sensors connected in a series arrangement with and individually mounted to each piece of equipment, each sensor comprising a housing coupling the ends of two of said optic fibers to permit transmission of light therethrough, each sensor coupling the ends of said two optic fibers aligned along a single axis, each sensor responsive to force applied to said housing to remove said housing from its respective piece of equipment to move at least one of said ends out of alignment with said single axis;

an emitter connected to one end of a first optic fiber in said series arrangement, said emitter generating and transmitting light into said cable; and a detector connected to one end of a last fiber optic cable in said series, said detector receiving said light after passage through said optic fibers and said sensors, said detector triggering an alarm when said optic fibers are misaligned from said axis at one of said sensors.

2. A method for protecting equipment from tampering or theft, comprising the steps of:

providing at least two optical fibers having ends;

coupling said optical fiber ends with a sensor comprising a housing, said housing aligning said optical fiber ends along a single axis to permit optical transmission therethrough;

mounting said housing on a piece of equipment so that force must be applied to said housing to remove said housing from said piece of equipment, said housing communicating said force to said optical fiber ends so that at least one of said first and second optical fiber ends becomes misaligned from said axis when said force is applied;

transmitting light into one of said two optical fibers by connecting an emitter to a second end of one of said two optical fibers; and monitoring light after passage through said optical fibers by connecting a detector to a second end of the other of said two optical fibers, said detector triggering an alarm when said one of said first and second optical fiber ends is misaligned from said axis.

3. A sensor for an optical security system for protecting equipment from tampering and theft, wherein the system includes an emitter transmitting light via optical fibers to a detector connected to an alarm, comprising:

a hub mounted to said equipment, said hub supporting the ends of two of said optical fibers in an orientation aligned along a single axis for passage of said light; and a cover for misaligning said optical fiber ends when said cover is moved relative to said hub, causing said light to be deflected and said alarm to be triggered.

4. A sensor for an optical security system as defined in claim 3, wherein said sensor comprises:

a base mounted directly on said equipment and rotatably mounting said hub; and said cover mounted over said hub and said base, said cover and said hub freely rotating around said base.

5. A sensor for an optical security system as defined in claim 4, wherein said base is mounted to said equipment with adhesive.

6. A sensor for an optical security system as defined in claim 4, wherein said hub is rotatably mounted to said base by an eyelet fastener.

7. A sensing coupler for use in an optical security system for protecting equipment from tampering or theft, said system having an emitter transmitting light to a detector and alarm via optical fibers, said sensing coupler comprising:

a base portion having a base surface for mounting to said equipment;

a hub rotatably mounted to said base, said hub having guide tabs disposed at opposite ends, said hub having deflector guide slots formed therein;

a cover, said cover having guide grooves formed therein, said guide grooves engaging said guide tabs to position said cover over said hub and said base portion, said protective cover having openings formed therethrough; and ends of a pair of said optical fibers inserted through said openings and into said deflector guide slots.

8. A sensing coupler for use in an optical security system for protecting equipment from tampering or theft, as defined in claim 7, wherein said deflector guide slots are oriented at opposite 45 angles from a longitudinal axis of said hub.

9. A sensing coupler for use in an optical security system for protecting equipment from tampering or theft as defined in claim 7, wherein said ends of said optical fibers are forcibly urged to be butted against each other into optical alignment.

10. A sensing coupler for use in a fiber optic security system for protecting equipment from tampering and theft as defined in claim 7, wherein said protective cover comprises a protruding wedge configured to urge said ends of said optical fibers toward one end of said deflector guide slots.

11. A sensing coupler for use in a fiber optic security system for protecting equipment from tampering and theft as defined in claim 7, wherein each deflector guide slot includes a first end and a second end, said ends of said pair of optical fibers first aligned along a single axis, and positioned in said one end of each of said deflector guide slots.

12. A sensing coupler for use in a fiber optic security system for protecting equipment from tampering and theft as defined in claim 11, wherein movement of said cover relative said hub causes said ends of said optical fibers to slide into said other end of said deflector guide slots.

13. A sensing coupler for use in a fiber optic security system for protecting equipment from tampering or theft having an emitter for transmitting light to a detector and alarm via optical fibers, said sensing coupler comprising:

a base;

a hub rotatably mounted to said base, said hub having slots formed therein: and a cover mounted over said hub and said base, said cover having openings formed therein and a projection disposed in the center thereof, said optical fibers inserted through said cover openings and said hub slots and aligned along a single axis by said cover projection, so that tampering with said cover displaces said optic fibers from their aligned position.

14. A sensor for an optical security system, wherein the system includes an emitter transmitting light via optical fibers to a detector connected to an alarm, comprising:

a base mounted directly on said equipment;

a glass tube having a notch supported on said base, said glass tube having a central passage, said optical fibers inserted through said central passage;

a compressed spring disposed below said glass tube, said spring displacing one of said optical fibers relative to the other when said glass tube is broken at said notch; and a cover mounted over said base, movement of said cover relative said glass tube applying pressure on said tube and causing it to break.

15. A sensor for an optical security system as defined in claim 14, wherein an inner periphery of the glass tube intimately surrounds an external periphery of said optical fibers.

16. A sensor for an optical security system as defined in claim 14, additionally comprising a rib attached to said base, said rib having an opening therein, said glass tube passing through said opening.

* * * * *